3,227,744
PROCESS FOR THE PREPARATION OF ESTERS FROM DIBASIC ACID ANHYDRIDES AND ORGANIC SULPHITES
Jacob van Gijzen, Vlaardingen, Netherlands, assignor to Fabriek Van Chemische Producten Vondelingenplaat N.V., Rotterdam, Netherlands, a corporation of Dutch Law
No Drawing. Filed Dec. 6, 1961, Ser. No. 157,594
Claims priority, application Netherlands, Dec. 8, 1960, 258,826
11 Claims. (Cl. 260—475)

The classical method for the preparation of esters consists in the esterification of acids or acid anhydrides with alcohols, resulting in the formation of esters and water. In order to obtain a sufficient quantity of the ester in the course of the equilibrium reaction involved, it is desirable to use an excess of alcohol and/or to remove the water. This removal of water may be effected, for instance, by adding a hygroscopic substance during the reaction or by distilling off the water with the excess of the alcohol. When alcohols with a greater number of carbon atoms than butanol are used, it is generally desirable to add an additional liquid which is to entrain the water during the distillation, such as benzene or dichloroethane. These processes are described in the BIOS Final Report No. 753, pp. 11–13 for the preparation of phthalates from phthalic anhydride and alcohols. In this case the yields are 80 to 90%. However, these processes take much time and call for the use of many auxiliary chemicals if high-grade esters of good purity are to be obtained.

In Kirk-Othmer, Encyclopedia of Chemical Technology, vol. 5, pp. 796 and 797 the preparation of diesters from dibasic acid anhydrides and alcohols is described, for which 2–4 times the theoretically required quantity of alcohol is used and the mixture, which contains sulphuric acid as a catalyst, is heated for 6–8 hours. Along with the excess of alcohol the water distils off. The yield amount of 94–98%. Disadvantages of said process are the corrosion caused by the acid reaction mixture and the difficulty of recovering the dry alcohol from the azeotrope obtained.

In Annales de Chimie (11) 6 (1936), p. 526 Levaillant describes the formation of esters by reaction of acid anhydrides with diethyl sulphite. This reaction proceeds smoothly when acetic anhydride is used, in which case the yield of ester is 80%, but when phthalic anhydride is used, the reaction takes place only when zinc chloride is used as a catalyst. After reacting 3 hours at a temperature of 130°–140° C., diethyl phthalate is obtained in a yield of 66%. This reaction has considerable advantages. The escaping sulphur dioxide has no corrosive effect because the reaction is carried out in an anhydrous medium, and an inert atmosphere is maintained by means of the sulphur dioxide developed; disadvantages, however, are the relatively low yield and the dark colour of the reaction products, in view of which it is again necessary to apply distillation under reduced pressure for the isolation of the ester formed.

Now it was found that these disadvantages of the reaction of the internal acid anhydrides of dibasic acids with organic sulphites can be avoided by using alkali metal salts of organic and/or inorganic acids as catalysts.

Thus the invention relates to a process for the preparation of diesters of dibasic acids capable of forming internal anhydrides by reacting said internal anhydrides of dibasic acids with sulphites derived from primary alcohols or phenols, in the presence of a catalyst, characterized by the use of alkali metal salts of organic and/or inorganic acids as catalysts.

One of the anhydrides of dibasic acids preferably used is phthalic anhydride. From said anhydride the diesters of phthalic acid are obtained, which are particularly suitable to be used as plasticizers for plastics, e.g. diethyl phthalate, dibutyl phthalate, and dioctyl phthalate. The reaction proceeds according to the following equation

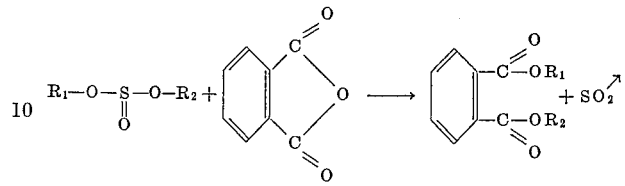

in which $R_1$ and $R_2$ represent different or identical primary alkyl groups containing no more than 16 carbon atoms, which may be substituted and/or interrupted by oxygen atoms, primary aralkyl groups, or aryl groups.

Other internal anhydrides that may be used as starting materials for the process according to the invention are the anhydrides of the substitution or hydrogenation products of phthalic acid, further of pyromellitic acid (the tetraester of which is formed), naphthalic acid, prehnitic acid, diphenic acid, maleic acid, succinic acid, as well as the substitution products of these acids.

The alkyl, aralkyl, or aryl sulphites used can be prepared in a simple way by converting primary alcohols or phenols with thionyl chloride (J. Am. Chem. Society 66, 1006–1007 (1944)).

If the alkali metals salts are used as catalysts the products are only slightly coloured and the yield of ester is very good. Distillation of the final product in order to obtain the purified esters is not required; the more such a purification is superfluous as substantially equimolecular quantities of the reaction components are used, so that no excess has to be removed. A treatment with active carbon, which may be preceded by a mild oxidation with sodium chlorite, in most cases suffices to obtain a very pure, substantially colourless product. The quantity of catalyst to be used varies generally from 0.1 to 5% by weight, calculated on the reaction mixture. Examples of alkali metal salts are in the first place lithium bromide, lithium chloride, and potassium fluoride, and further potassium bromide, potassium diphthalate, potassium bicarbonate, and potassium sulphate.

The reaction is carried out by heating the organic sulphite and the anhydride under continuous stirring to a temperature between 100° and 200° C. Although it is not necessary, as a rule a small excess of sulphite is used, in order to compensate for any sulphite that may be entrained by the sulphur dioxide. The sulphur dioxide is collected and its quantity is measured. The reaction is complete when substantially the calculated quantity of sulphur dioxide has escaped or when the acid value of the reaction product has become sufficiently low.

The following examples illustrate the invention without any restriction.

*Example I*

A mixture of 222 g. of phthalic anhydride (1.500 mols) and 170 g. of dimethyl sulphite (1.545 mols) is heated with stirring to 110°–120° C. until a clear solution has been obtained. Then, 4 g. of dried potassium fluoride is added. After a few minutes a quiet sulphur dioxide evolution starts. The temperature of the mixture is then increased to such an extent that the evolution of gas continues to proceed spontaneously. After about 4 hours, when the temperature is about 155° C., the weight of the reaction mixture has decreased slightly below the calculated weight. The colour of the reaction mixture is a pale yellow. Next 2 g. of active carbon is added, subsequently the mixture is stirred for some time and then filtered at about 80° C. The product obtained consists of 280 g. of colourless, water-clear dimethyl phthalate ($n_D^{22}=1.5149$; acid value 1.5).

Yield 96.2%.

*Example II*

In the same way as in Example I, diethyl phthalate is prepared from 222 g. of phthalic anhydride and 215 g. of diethyl sulphite. The catalyst used is 8 g. of potassium bromide, while the reaction temperature is 165° C. Before the treatment with active carbon, dry air is blown through the reaction mixture for a short time, in order to remove dissolved sulphur dioxide and any excess of sulphite. The yield of purified ester amounts to 96.0%; $n_D^{21.5}=1.5010$; acid value 0.1.

*Example III*

In the same way as in Example I bis(methoxyethyl) phthalate is prepared from ½ mol of phthalic anhydride and a 5% excess of bis-methoxyethyl sulphite. The catalyst consists of a mixture of 1 g. of potassium chloride, 2 g. of potassium sulphate, and 2 g. of potassium diphthalate. The initial temperature is 125° C. and the final temperature is 145° C. The yield of the ester is quantitative. With a view to the improvement of the colour a second treatment takes place, consisting of an oxidation with 0.2% of sodium chloride, followed by a treatment with active carbon. Yield 96.9%;

$$n_D^{20}=1.5018$$

acid value 1.8.

*Example IV*

From phthalic anhydride and di-n-butyl sulphite, with the use of 0.5% of potassium bifluoride, di-n-butyl phthalate is prepared. The reaction proceeds quantitatively at about 170° C. in about 3 to about 4 hours. Yield after purification 95.8%; $n_D^{20}=1.4920$; acid value 1.5.

*Example V*

27.0 g. of pyromellitic anhydride and 29.0 g. of dimethyl sulphite react spontaneously at 110°–120° C. under the influence of 0.5 g. of potassium bicarbonate. At the end of the sulphur dioxide evolution the mixture is heated to 150° C. The total reaction time is about 30 minutes. After cooling, the tetramethyl ester of pyromellitic acid is obtained in a quantitative yield as a substantially colourless substance having a melting point of 137°–139° C. For the removal of the catalyst the ester is dissolved in 250 g. of boiling ethanol, filtered, and cooled. A quantity of 94% of the purified ester is obtained in this way in the crystalline form. The melting point has remained unchanged.

*Example VI*

With lithium bromide as a catalyst, di-octyl phthalate is prepared from phthalic anhydride and di-(2-ethylhexyl) sulphite as described in Example IV. At the end of the reaction a light reddish brown product is obtained in a quantitative yield, with an acid value of 6.8 and $$n_D^{19}=1.4860$$

The colour of the product is greatly improved by a second treatment consisting of oxidation with potassium permanganate and a treatment with active carbon. The acid value decreases to 0.9, while the refractive index hardly changes. In this second treatment 4% of the yield is lost.

*Example VII*

100 g. of succinic anhydride (0.50 mol) and 123 g. of diphenyl sulphite (0.525 mol) are heated with stirring with 2 g. of lithium bromide until the reaction starts. The sulphur dioxide evolution starts at about 120° C.; the temperature is raised at such a rate that the evolution of gas continues to proceed spontaneously. The reaction is completed after a few hours, the theoretical quantity of sulphur dioxide has then escaped and the final temperature is 150° C. The reaction mixture solidifies upon cooling, and the yellowish brown-coloured diphenyl succinate has a melting point of 114°–116° C.

The removal of the catalyst is effected by dissolution in ethanol, filtration, and cooling. In this way the purified diphenyl ester of succinic acid is obtained in a yield of 125 g., i.e. 93% of the theoretical yield. The melting point is 120°–121° C.

*Example VIII*

74 g. of phthalic anhydride (0.50 mol) and 88 g. of ethylbutyl sulphite (0.53 mol) are reacted in the presence of a catalyst consisting of 1 g. of lithium bromide, 1 g. of potassium diphthalate, and 3 g. of potassium sulphate. The reaction temperature increases from 140° to 170° C. After a period of 8 hours, ethyl-butyl phthalate is obtained in a quantitative yield.

Acid value 3.5; $n_D^{18}=1.4945$.

After the above-mentioned after treatment, the purified ester is obtained in a yield of 98%; acid value 1.9 and $n_D^{20}=1.4943$.

What I claim is:

1. A process for the preparation of a diester of a dicarboxylic acid, characterized in reacting at 100–200° C. an internal anhydride of a dicarboxylic acid with a sulphite having the general formula

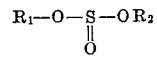

wherein $R_1$ and $R_2$ are each selected from the group consisting of alkyl radicals containing no more than 16 carbon atoms, alkoxyalkyl radicals containing no more than 16 carbon atoms, aralkyl radicals and aryl radicals in the presence of 0.1 to 5% by weight of a catalyst selected from the group consisting of lithium chloride, lithium bromide, potassium fluoride, potassium bromide, potassium chloride, potassium sulphate, potassium diphthalate, and potassium bicarbonate.

2. The process of claim 1 wherein the dibasic acid is a phthalic acid.

3. The process of claim 2 wherein the diester is a member selected from the group consisting of diethyl phthalate, dibutyl phthalate and dioctyl phthalate.

4. The process of claim 1 wherein the sulphite is dialkyl sulphite, the alkyl group containing not more than 16 carbon atoms.

5. The process of claim 1 wherein a small excess of sulphite is employed.

6. The process of claim 1 wherein the catalyst is lithium bromide.

7. The process of claim 1 wherein the catalyst is lithium chloride.

8. The process of claim 1 wherein the catalyst is potassium fluoride.

9. The process of claim 3 wherein the catalyst is lithium bromide.

10. The process of claim 3 wherein the catalyst is lithium chloride.

11. The process of claim 3 wherein the catalyst is potassium fluoride.

References Cited by the Examiner

UNITED STATES PATENTS 3,080,405  3/1963  Larsen et al. _____ 260—475

OTHER REFERENCES

Iselin et al., Helv. Chim. Acta., Vol. 40, 373–387 (1957).

Levaillant, Ann. de Chim., Vol. 6, 526 (1936).

LORRAINE A. WEINBERGER, *Primary Examiner.*

DUVAL McCLUTCHEN, LEON ZITVER, *Examiners.*